2,923,322
UNITARY DIAPHRAGM AND CARRIER WIRE ASSEMBLY FOR GAS METERS

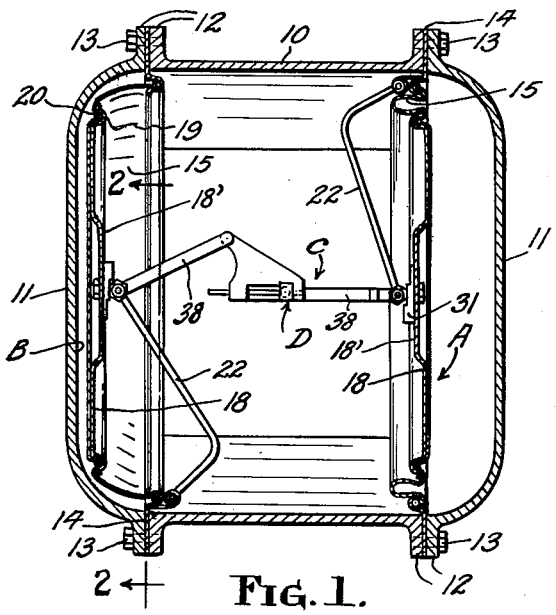
Feb. 2, 1960     E. R. GILMORE     2,923,322
UNITARY DIAPHRAGM AND CARRIER WIRE ASSEMBLY FOR GAS METERS
Filed Nov. 13, 1956
INVENTOR
Edward R. Gilmore
BY
ATTORNEY United States Patent Office 2,923,322
Patented Feb. 2, 1960

Edward R. Gilmore, Tulsa, Okla., assignor to Karl L. Schaus, Lancaster, Ohio

Application November 13, 1956, Serial No. 621,846

3 Claims. (Cl. 137—785)

This invention relates to an integral diaphragm and support or mounting for use in meters and especially in displacement type gas meters to generally simplify and materially save labor in the accurate installation thereof into the meter.

A primary object is to provide a construction, which unlike existing ones will adequately and accurately align and generally position the diaphragm center pan at the ends of the diaphragm stroke and in fact throughout the path of diaphragm travel, enabling use of the most effective part of the diaphragm stroke.

It is also aimed to provide a construction which is advantageous not only for leather diaphragms but one which especially meets the requirements demanded by the use of displacement gas meter diaphragms when made of synthetic materials, in that the novel structure especially will hold any center pan in a central location with respect to the outer annular flange at the extreme ends of the diaphragm stroke, has provision for various adjustments to compensate for variations in meter body construction in order to obtain the same distance of the center pan travel from the flange face in both directions, will not cause the flexible material of the diaphragm to twist or wrinkle at any position of the diaphragm stroke, and will not cause undue friction in either the mechanism or the flexible diaphragm material itself.

Another object is to predicate the novel integral structure upon the employment of a means such as an annular ring or flange, to insure a location of the structure which will be uniform on all diaphragms of a given type or size with respect to the vertical and horizontal distance from the center of such annular ring or flange, as well as at the same uniform distance from the flange face of the ring on each diaphragm.

Further, the invention provides novel means for mounting the diaphragm support bracket on the center pan in such a position that it will be correctly located with respect to the center of the center pan, both horizontally and vertically, and the correct distance from the surface of the pan, so that a carrier element of uniform construction may be used to connect the bearing brackets and thus bring about a diaphragm travel which meets the requirements of holding the center pan in a central location at extreme stroke positions and travel equidistant both ways from the outer flange face; provides for location of the side bracket so that the latter will not be dependent upon the location of screw holes in the main body of the meter; provides a novel spacer bracket to compensate for the variations in meter case width; enables the carrier element to be simplified and disposed at a lower position where it is less apt to interfere with other parts in the meter; and provides a construction which avoids the use of any hole in the diaphragm material incident to installation.

One embodiment of the invention, by way of example, is shown in the accompanying drawings wherein:

Fig. 1 is a central horizontal sectional view taken through a gas meter employing my improvements;

Fig. 2 is a vertical sectional view taken on the line 2—2 of Fig. 1;

Figs. 3 and 4 are detail horizontal sectional views, taken respectively on line 3—3 and 4—4 of Fig. 2;

Fig. 5 is an enlarged fragmentary partial elevation and section showing the carrier bracket connection at the center pan; and Fig. 6 is an enlarged fragmentary partial elevation and section showing the carrier bracket connection at the flange ring.

Referring specially to the drawing, from a consideration of which various additional objects and advantages will be apparent, I have shown a duplex bellows displacement type of meter as one practical embodiment, but the invention is not limited to a meter which employs a plurality of the integral diaphragms and supports since the invention may equally well be practiced in a construction of meter which employs a single integral diaphragm and support according to the invention. The illustrated meter has a casing or housing composed for instance of a body section 10 and end sections 11, such sections 10 and 11 having flanges 12 separably secured together as by means of bolts 13.

According to the instant disclosure integral diaphragm and support structure are found at A and B. Each structure A and B has a generally flat annular flange or ring 14 clamped gas-tight between the adjacent flanges 12 as by means of said bolts 13, each ring 14 preferably having holes 14' through which the bolts are passed. Flanges or rings 14 are of metal or any other rigid material suitable for the purpose and they are disposed marginally of and carry the flexible diaphragms 15 to perform the usual function, such diaphragms 15 being secured gas-tight and marginally in any suitable manner to the flange rings and by way of example in annular channel portions 16 integral with the flange rings by annular wires or threads 17.

A metallic or equivalent center pan 18 is connected in any suitable way to each diaphragm 15, and for example each center pan 18 has a marginal channel 19 in which the coacting diaphragm 15 is clamped by an element 20 such as a split ring, cord or the like.

Each of the said integral diaphragm and support structures A and B includes a carrier element or wire 22 appropriately shaped to avoid interference with adjacent meter parts and which in view of the construction of the instant invention may be mounted within the meter at a lower elevation than is usual for the mounting of carrier wires in conventional constructions.

Each carrier wire 22 has parallel end journal portions 23 and 24. Portions 24 are journaled or pivoted in plastic or other bushings 25 and have shoulders 26 which rest thereon. Bushings 25 are pressed into bearings 21 and an antifriction bearing ball 27 is preferably interposed between the end of portion 24 and an interior wall of associated bearing 21.

Each bearing 21 is secured to one of the center pans 18 without perforating the diaphragm and preferably by a bolt 28 passed through a slot 29 in the bearing and screw-threaded into a nut 30 soldered onto a struck-out portion 18' of the center pan. Said slot 29 is enlarged both vertically and horizontally to provide an adjustable connection and particularly to enable adjustment of the connection radially of the diaphragm. A spacer 31 having an enlarged slot 31' through which bolt 28 passes is interposed between the bearing 21 and center pan, such spacer being stepped as at surfaces 32, any of which may be selectively positioned between bearing 21 and portion 18' as in Fig. 4 according to the axial adjustment desired for the bearing 21.

The journal or portion 23 is pivotally mounted on flange ring 14 in a replaceable plastic or other bushing 33 of a bearing 34 forming a part of or secured to the ring 14. Said bushing 33 may have a shoulder 35 overlapping the bearing 34 and be held therein against displacement by a removable key 36 coacting with a head 37 on the journal 23. Part 36' is a washer.

Operatively connecting the two integral diaphragms and supports A and B is suitable linkage having a conventional operating means D for the drive shaft of a conventional register, not shown, which forms no part of the present invention. This linkage C has a link element 38 at each integral diaphragm and carrier A and B, pivotally connected to the bracket or bearing 21 thereof and detachably held connected thereto by a head 39 thereon and coacting key 40.

As a result of the construction described, the side bearing bracket 34 is carried by the flange ring 14 and the various objects previously mentioned are attained, it being particularly noted that an integral diaphragm and support has been provided which may be used singly or in pluralities according to the type of meter. The location of the bearings or brackets 21 and 34 is uniform and all desirable adjustments facilitating alignment and assembly of the parts is provided at the bearing or bracket 21. Use of the most effective part of the diaphragm stroke is attained with the structure especially rendering practical the employment of a diaphragm 15 of synthetic resin composition.

Various changes may be made within the spirit and scope of the invention.

I claim:

1. A unitary diaphragm and carrier structure comprising an endless mounting flange for use in attaching said integral structure to a casing, a center pan, a flexible diaphragm extending from the center pan to the flange, a carrier element, said carrier element having portions at spaced locations pivoted to said flange and to said pan, respectively, on parallel axes, and means connecting said carrier element with said pan providing adjustment of the carrier element radially and axially with respect to said center pan.

2. A unitary diaphragm and carrier structure comprising an endless flange, a center pan, a flexible diaphragm extending from the center pan to the flange, a carrier element, said carrier element having portions at spaced locations being pivoted to said flange and to said pan, respectively, on parallel axes and means to adjust the position of the carrier element with respect to said center pan comprising a bearing bracket connected with said carrier element, means fastening said bearing bracket to the center pan, and a slotted spacer positioned between the bearing bracket and center pan having portions of different thicknesses thereon for selective interposition between said bearing bracket and said center pan.

3. A unitary diaphragm and carrier structure comprising an endless rim, a center pan, a flexible diaphragm extending from the center pan to the rim, a carrier element, said carrier element having portions at spaced locations pivoted to said rim and to said pan, respectively, on parallel axes and means operable to position the axis of the carrier element at said center pan at different distances with respect to the center pan, said means comprising a bearing bracket, a spacer positioned between the bearing bracket and center pan having portions of different thicknesses for selective positioning to locate the axis of the carrier element at said center pan at different distances with respect to the center pan, a nut fixed to said center pan, and a bolt threaded in said nut securing said bracket to the center pan with said spacer therebetween.

References Cited in the file of this patent

UNITED STATES PATENTS

| 792,118 | Chrisman | June 13, 1905 |
| 876,875 | Henning | Jan. 14, 1908 |
| 1,668,078 | Huettig | May 1, 1928 |

FOREIGN PATENTS

| 6,454 | Great Britain | Jan. 2, 1913 |